United States Patent [19]

Pepper

[11] Patent Number: 4,673,824
[45] Date of Patent: Jun. 16, 1987

[54] POWER SUPPLY SWITCH CIRCUIT

[75] Inventor: Steven H. Pepper, Portland, Oreg.

[73] Assignee: Tektronix, Inc., Beaverton, Oreg.

[21] Appl. No.: 835,492

[22] Filed: Mar. 3, 1986

[51] Int. Cl.[4] ............................................. H02J 9/06
[52] U.S. Cl. ......................................... 307/64; 307/66
[58] Field of Search ................................. 307/64, 66; 365/228–229

[56] References Cited

U.S. PATENT DOCUMENTS

| 3,505,531 | 4/1970 | Wattson | 307/64 |
| 3,859,638 | 1/1975 | Hume, Jr. | 365/228 |
| 3,980,935 | 9/1976 | Worst | 365/228 |
| 4,342,922 | 8/1982 | DiMassimo et al. | 307/66 |
| 4,560,887 | 12/1985 | Schneider | 307/66 |
| 4,611,302 | 9/1986 | Bolkett-Pugh | 365/229 |

Primary Examiner—Vit W. Miska
Attorney, Agent, or Firm—Mark L. Becker; George T. Noe

[57] ABSTRACT

A power supply switch circuit includes a transistor for switchably connecting portions of a current path between a standby power supply and a power supply controller, with a capacitor as a temporary current source for the controller once the path portions are disconnected. The transistor is coupled to a switch which causes the transistor to connect and disconnect the portions of the current path. The capacitor is coupled to the transistor for discharging current to the power supply controller for a predetermined time after the switch signals the transistor to disconnect the path portions. A power-down indicator senses this signal by the switch to the transistor and in response transmits an alert signal to the instrument logic warning that a break in current is imminent. This warning permits the logic to save relevant information while power is provided through the capacitor.

6 Claims, 3 Drawing Figures

POWER SUPPLY SWITCH CIRCUIT

BACKGROUND OF THE INVENTION

1. Field of the Invention

This invention relates to a remote control switch circuit and more particularly to a switch circuit that remotely controls the power supply of an instrument by a low current signal path and provides temporary power after the supply has been disconnected for orderly power down of the instrument.

2. Description of the Prior Art

The power supply of an instrument is typically controlled by a manually operated front panel switch. This switch connects and disconnects lines which carry high input voltages and current through the instrument to the front panel. When the switch is opened, the lines are disconnected and the power is immediately cut off to all circuitry within the instrument.

Although inexpensive and simple in operation, such conventional power switches suffer from several major drawbacks. First, the high input voltages and current which are run through the instrument to the front panel pose a significant hazard to operator safety. Second, the immediate cutoff of power to the instrument can cause the loss of important information that has not been stored by the instrument. Moreover, conventional power switches also lack the capability to permit external control of the instrument by a remote device.

SUMMARY OF THE INVENTION

Therefore, it is an object of the invention to provide an improved power supply switch circuit for controlling the power supply of an instrument.

It is another object of the invention to provide for external control of the instrument by a remote device.

It is still another object of the invention to provide a power supply switch circuit that avoids the need to run hazardous line voltages through the instrument.

It is yet another object of the invention to provide a power supply switch circuit that enables a microprocessor-based instrument to store information in an orderly manner before power is completely lost to the instrument.

To achieve these objects, a preferred embodiment of the power supply switch circuit for enabling and disabling power within an instrument comprises an electronic means such as a transistor for switchably connecting portions of a current path between a standby power supply and a power supply controller for a main power supply. The transistor includes an input connected to a first portion of the current path and an output connected to a second portion of the current path. A switch means causes the transistor to switchably connect and disconnect the first and second portions of the current path. The power supply switch circuit further includes a temporary current source means such as a capacitor coupled to the transistor for providing current to the current path for a predetermined time after the transistor disconnects the portions of the current path. The capacitor recharges when the switch means causes the transistor to connect the portions of the current path.

In one aspect of the invention, an indicating means is coupled to the transistor for sensing its switching to disconnect the portions of the current path. The indicating means transmits in response to this disconnection an alert signal indicating that a break in current is imminent and that current is being provided to the second portion of the current path for only a predetermined time thereafter.

The switch means comprises, in addition to a front panel switch, a connector for receiving an external signal from a remote device. The connector thus enables the power supply of the instrument to be controlled remotely.

The foregoing and other objects, features, and advantages of the invention will become more apparent from the following detailed description of a preferred embodiment which proceeds with reference to the accompanying drawings. It should be understood, however, that this embodiment is for purposes of illustration only and that the invention is not so limited.

DETAILED DESCRIPTION

Figure 1:
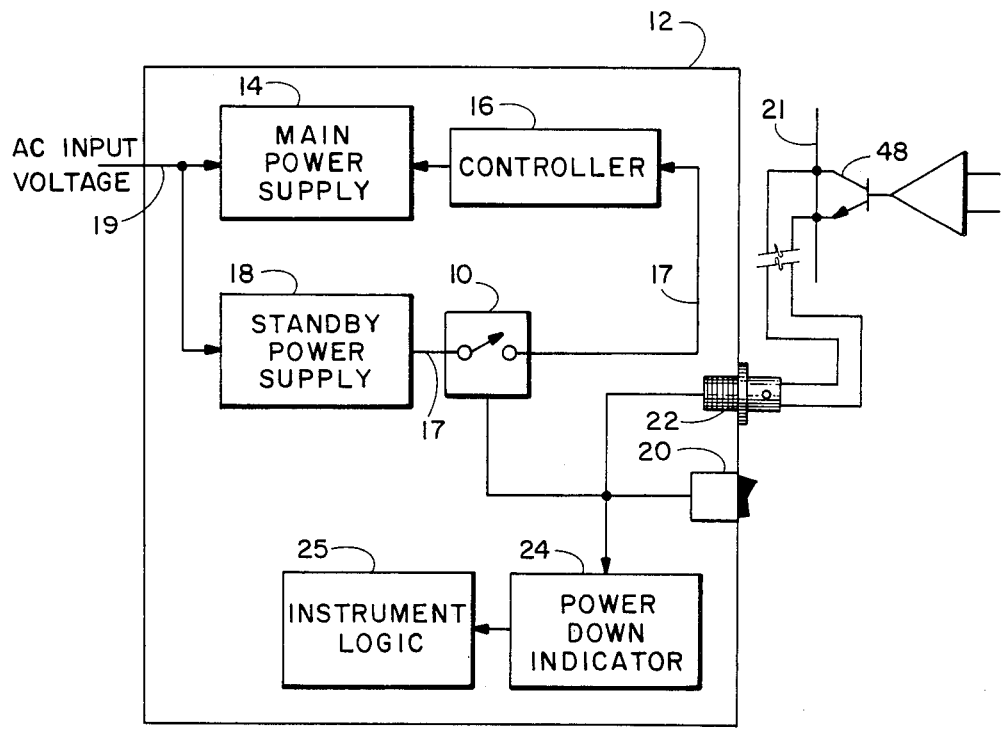
FIG. 1 is a block diagram showing a power supply switch circuit according to the invention within an instrument the circuit controls.

A power supply switch circuit 10 according to the invention is shown in FIG. 1 within an instrument 12 which such switch circuit controls. In the embodiment of the invention described herein, the switch circuit 10 is used to control the supply of power from a main power supply 14 controlled by a power supply controller 16, both of conventional design and function. Controller 16 is powered by a standby power supply 18 that switchably connects to it along a current path 17 through switch circuit 10. Main power supply 14 and standby power supply 16 both connect to the input voltage source 19. Switch circuit 10 connects the standby power supply 18 to the power supply controller 16 when signaled to do so by front panel switch means such as manual switch 20 or by a remote control device 21 transmitting an external signal through a connector 22. When either switch means signals circuit 10 to disconnect the standby power supply 18 from the controller 16, switch circuit 10 does so but also temporarily continues to provide power to the power supply 18 for a predetermined time thereafter. The disconnection of the current path is sensed by power-down indicator 24 within instrument 12 to alert the internal instrument logic 25 such as a microprocessor that a power shutdown of instrument 12 is imminent. With such a warning, the logic 25 can save relevant information within the predetermined time before power is completely lost.

Figure 2:
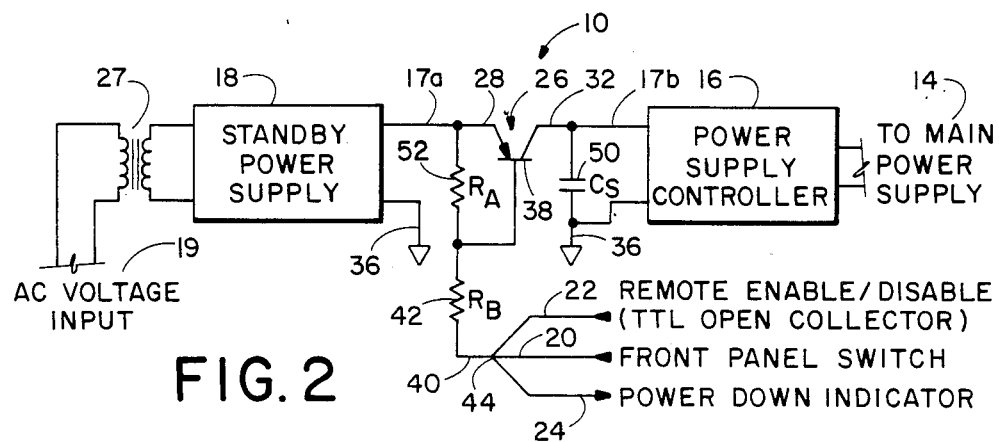
FIG. 2 is a schematic diagram of the circuit of FIG. 1.

Electronic means within circuit 10 for switchably connecting a first portion 17a of path 17 to a second portion 17b are shown in FIG. 2. Such means comprise a PNP transistor 26 of conventional design and capable of handling 20 volts and up to several hundred milliamps of current. The emitter 28 of transistor 26 forms the input of the transistor and is connected to standby power supply 18 by the first portion 17a of path 17. To minimize danger to the instrument operator, standby power supply 18 is connected to the voltage source 19 across an isolation transformer 27. The collector 32 of transistor 26 forms the output of such transistor and is connected to the power supply controller 16 by second portion 17b of path 17. The return current path from controller 16 to standby power supply 18 is through ground connections 36. The base 38 of transistor 26 is coupled to the control switch 20, connector 22, and power-down indicator 24 through signal path 40 and a current resistor 42.

Transistor 26 is rendered conductive by completing a circuit from base 38 to ground through connector 22 or panel switch 20, which together form a wired OR connection at node 44. Switch 20 is a conventional toggle switch, while connector 22 provides connection to a remote device 21 that can generate an external control signal. Referring to FIG. 1, this control signal is typically a TTL level signal generated by an open collector on a transistor 48 within device 21. The ground through either switch means 20 or 21 renders transistor 26 conductive, thereby connecting path portions 17a, 17b through emitter 28 and collector 32. As current flows from the collector 32 to the controller 16, it charges a storage capacitor 50 coupled to the collector 32 and ground. This capacitor acts as a temporary current source, storing charge for providing current to second path portion 17b and controller 16 for a predetermined time after transistor 26 is switched off.

The switch means 20 or 21 switches transistor 26 off by breaking the circuit to ground through path 40. This switching off of the transistor electrically disconnects path portions 17a, 17b to supply 18 and controller 16. In response to the disconnection, a pull-up resistor 52 coupled between emitter 28 and base 38 provides a pull-up voltage to the base to shut off transistor 26. The resistor 52 also transmits the voltage to node 44, where it is sensed by power-down indicator 24. Power-down indicator 24 in turn generates an alert signal to alert the instrument logic 25 that a power shutdown of instrument 12 is imminent. Current is then provided to power supply controller 16 by storage capacitor 50 which discharges for a predetermined time of sufficient length for the instrument logic 25 to save relevant information.

Figure 3:
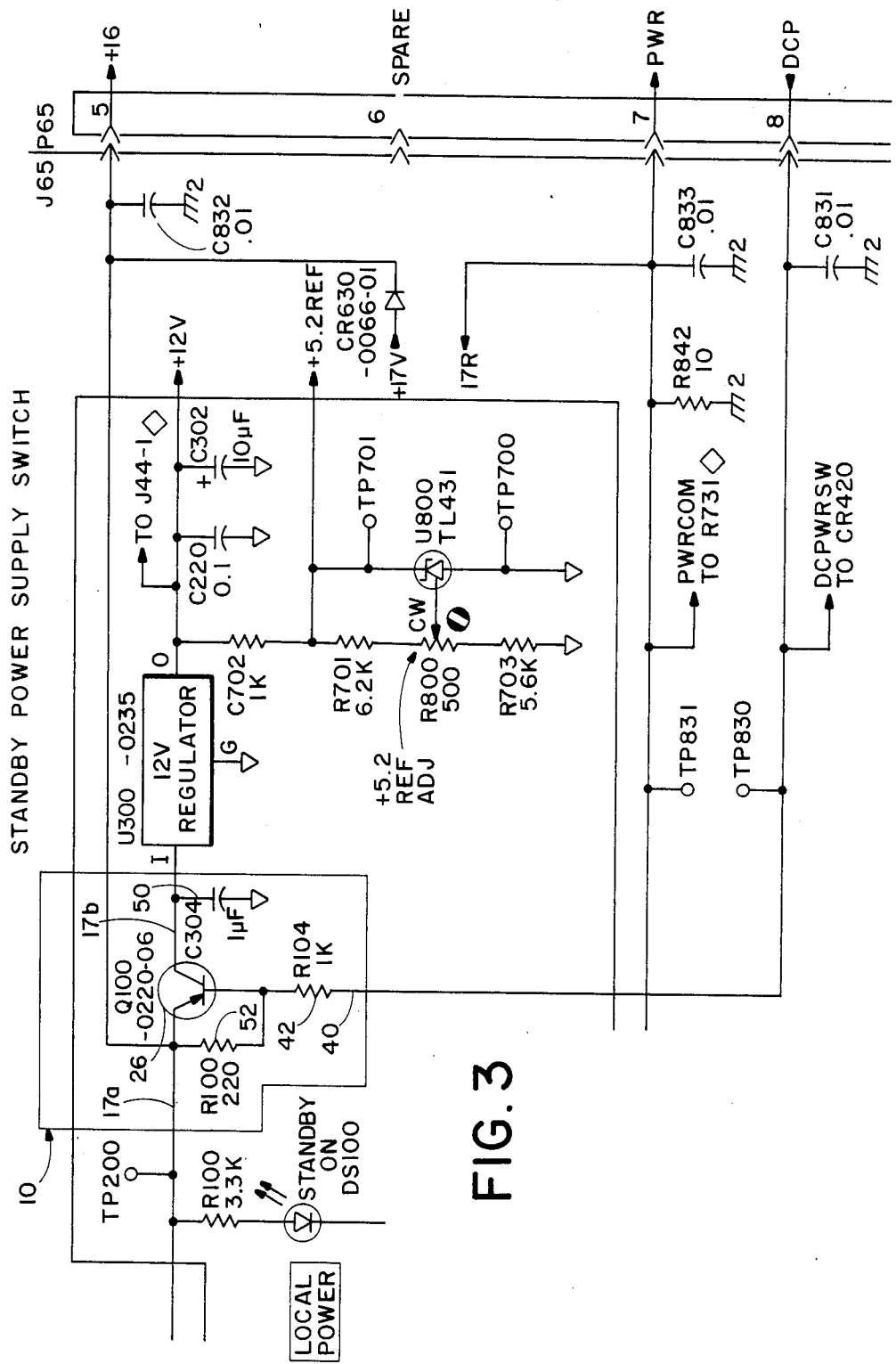
FIG. 3 is an embodiment of a circuit of FIG. 2 in a power supply circuit.

FIG. 3 shows a schematic design of switch circuit 10 in a power supply circuit, with typical values for the components given.

Having illustrated and described the principles of the invention in a preferred embodiment, it should be apparent to those skilled in the art that the invention can be modified in arrangement and detail without departing from such principles.

I claim all modifications coming within the spirit and scope of the following claims.

1. A switch circuit for enabling and disabling power within a electrical instrument, comprising:
   a current path having a first portion and a second portion;
   transistor means for switchably connecting the portions of the current path, the means having an input connected to the first portion and an output connected to the second portion;
   a standby power supply connected to the first portion of the current path and a power supply controller for a main power supply connected to the second portion, the current from the standby power supply being transmitted through the transistor means for enabling the power supply controller to control the main power supply;
   switch means coupled to the transistor means for signaling the transistor means to electrically connect and disconnect the portions of the current path; and
   temporary current source means coupled to the output portion of the transistor means for providing current to the second portion of the current path for a predetermined time after the switch means signals the transistor means to disconnect the first and second portions of the current path.

2. A switch circuit for enabling and disabling power within an electrical instrument, comprising:
   a current path having a first portion and a second portion;
   transistor means for switchably connecting the portions of the current path, the means having an input connected to the first portion and an output connected to the second portion in which the input of the transistor means is the emitter of a transistor and the output of the transistor means is the collector of the transistor;
   switch means coupled to the base of the transistor means for signaling the transistor means to electrically connect and disconnect the portions of the current path; and
   temporary current source means coupled to the output portion of the transistor means for providing current to the second portion of the current path for a predetermined time after the switch means signals the transistor means to disconnect the first and second portions of the current path.

3. The circuit of claim 2 including indicating means coupled to the transistor means for sensing when the transistor means disconnects the first and second portions of the current path and for transmitting in response an alert signal indicating that a break in current is imminent and that current is being provided to the second portion for only a predetermined time thereafter.

4. The circuit of claim 2 in which the switch means is a remote control device and the circuit includes a connecting means for connecting the remote control device to the transistor means, thereby enabling the remote control device to enable and disable power within the instrument.

5. A power supply switch for controlling a main power supply of an instrument by switchably connecting a power source to a power supply controller that controls the main power supply, comprising:
   a transistor switchably connecting the power source and power supply controller, the transistor having an emitter coupled to the power source, a collector coupled to the power supply controller, and a base for controlling the transistor;
   a switch means coupled to the base for rendering the transistor conductive and switching it off, thereby connecting and disconnecting the power source and power supply controller;
   resistance means coupled between the emitter and the base for switching the transistor off in response to the switch means;
   capacitance means coupled to the collector for discharging current to the power supply controller for a predetermined time after the switch means switches the transistor off, the capacitance means recharging when the switch means renders the transistor conductive; and
   indicating means coupled to the base for sensing when the switch means signals the transistor to switch off and transmitting in response an alert signal to the instrument indicating that a break in current is imminent following the discharge by the capacitance means.

6. The circuit of claim 5 in which the switch means is a remote control device generating an external signal and the circuit includes a connector for connecting the remote control device to the transistor to enable the remote control device to control the instrument power by the external signal.

* * * * *